US012413550B2

(12) United States Patent
Cui et al.

(10) Patent No.: US 12,413,550 B2
(45) Date of Patent: Sep. 9, 2025

(54) MEDIA ACCESS CONTROL (MAC) ADDRESS ASSIGNMENT FOR VIRTUAL NETWORK INTERFACE CARDS (VNICS)

(71) Applicant: VMware LLC, Palo Alto, CA (US)

(72) Inventors: Kejia Cui, Beijing (CN); Lele Zhang, Beijing (CN); Qi Wu, Beijing (CN); Donghai Han, Beijing (CN); Honggang Liu, Beijing (CN)

(73) Assignee: VMware LLC, Palo Alto, CA (US)

( * ) Notice: Subject to any disclaimer, the term of this patent is extended or adjusted under 35 U.S.C. 154(b) by 402 days.

(21) Appl. No.: 18/105,880

(22) Filed: Feb. 6, 2023

(65) Prior Publication Data

US 2024/0205184 A1    Jun. 20, 2024

(30) Foreign Application Priority Data

Dec. 19, 2022 (WO) ................ PCT/CN2022/139870

(51) Int. Cl.
*H04L 61/50* (2022.01)
*H04L 45/00* (2022.01)
*H04L 101/622* (2022.01)

(52) U.S. Cl.
CPC .............. *H04L 61/50* (2022.05); *H04L 45/66* (2013.01); *H04L 2101/622* (2022.05)

(58) Field of Classification Search
CPC ......... H04L 61/50; H04L 45/66; H04L 45/74; H04L 45/741; H04L 45/76; H04L 2101/622; H04L 61/5038; H04L 41/122; H04L 41/40; H04L 41/0893; H04L 41/0895
See application file for complete search history.

(56) References Cited

U.S. PATENT DOCUMENTS

| 2004/0146052 A1* | 7/2004 | Chang ..................... H04L 69/12 370/392 |
| 2012/0014387 A1* | 1/2012 | Dunbar ................. H04L 61/103 370/400 |
| 2015/0186174 A1* | 7/2015 | Borkmann .......... G06F 9/45558 718/1 |

* cited by examiner

*Primary Examiner* — Mohamed A Kamara
(74) *Attorney, Agent, or Firm* — King Intellectual Asset Management

(57) ABSTRACT

Example methods and systems for media access control (MAC) address assignment for virtual network interface cards (VNICs) are described. One example may involve a first computer system may determining a first MAC address portion that is uniquely associated with the first computer system. A first VNIC may be assigned with a first MAC address that includes (a) the first MAC address portion and (b) a third MAC address portion that is uniquely associated with the first VNIC on the first computer system. A second VNIC may be assigned with a second MAC address that includes (a) the first MAC address portion and (b) a fourth MAC address portion that is uniquely associated with the second VNIC on the first computer system. The first computer system may perform traffic handling by processing packets specifying the first MAC address or the second MAC address.

21 Claims, 5 Drawing Sheets

MEDIA ACCESS CONTROL (MAC) ADDRESS ASSIGNMENT FOR VIRTUAL NETWORK INTERFACE CARDS (VNICS)

CROSS REFERENCE TO RELATED APPLICATION

The present application claims the benefit of Patent Cooperation Treaty (PCT) Application No. PCT/CN2022/139870, filed Dec. 19, 2022, which is incorporated herein by reference.

BACKGROUND

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each VM is generally provisioned with virtual resources to run an operating system and applications. The virtual resources may include central processing unit (CPU) resources, memory resources, storage resources, network resources, etc. In practice, a media access control (MAC) address may be assigned to a virtual network interface card or virtual network adapter (VNIC) for use as a network hardware address to facilitate traffic forwarding within an SDDC. Since it is necessary to ensure that each VNIC has a unique MAC address, one conventional approach is to perform the MAC address assignment for all VNICs in a centralized manner.

DETAILED DESCRIPTION

Figure 1:
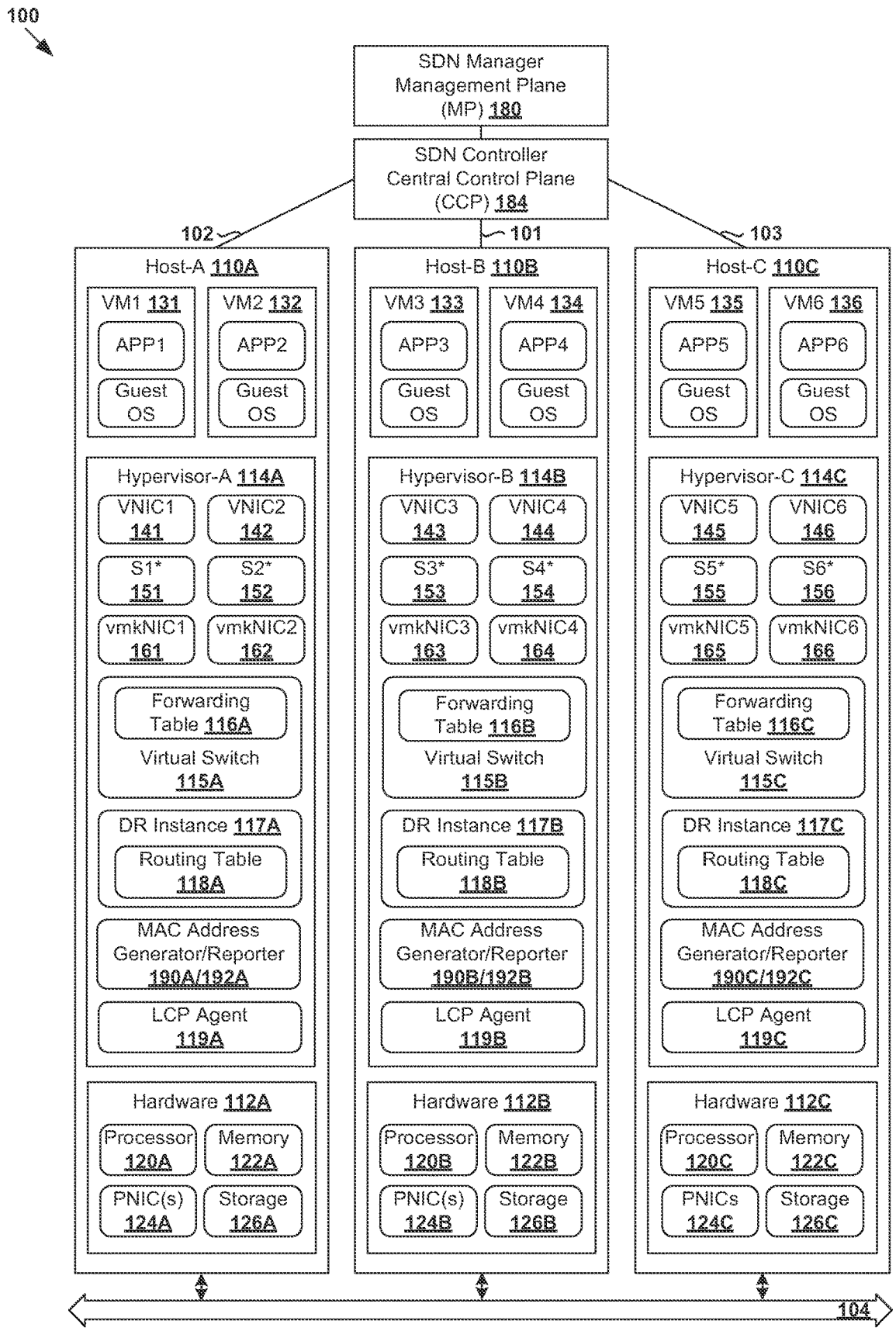
FIG. 1 is a schematic diagram illustrating an example network environment in which Media Access Control (MAC) address assignment may be performed for virtual network interface cards (VNICs)

According to examples of the present disclosure, media access control (MAC) address assignment may be implemented more efficiently in a network environment that includes a first computer system and multiple second computer systems. Examples of the present disclosure should be contrasted against conventional approaches that rely on a centralized management entity to assign a MAC address to each and every VNIC. One example may involve a first computer system (e.g., host 110A in FIG. 1) determining a first MAC address portion (e.g., MAC-PREFIX-A) that is uniquely associated with the first computer system. The multiple second computer systems (e.g., hosts 110B-C) may be uniquely associated with respective multiple second MAC address portions (e.g., MAC-PREFIX-B and MAC-PREFIX-C).

The first computer system may assign a first virtual network interface card (VNIC) with a first MAC address that includes (a) the first MAC address portion and (b) a third MAC address portion that is uniquely associated with the first VNIC on the first computer system. The first computer system may assign a second VNIC with a second MAC address that includes (a) the first MAC address portion and (b) a fourth MAC address portion that is uniquely associated with the second VNIC on the first computer system. The first computer system may then perform traffic handling by forwarding first packets specifying the first MAC address assigned to the first VNIC, or second packets specifying the second MAC address assigned to the second VNIC.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

FIG. 1 is a schematic diagram illustrating example network environment 100 in the form of a software-defined networking (SDN) environment in which MAC address assignment for VNICs may be performed. Depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.). Each host may be supporting tens or hundreds of virtual machines (VMs). It should be understood that examples of the present disclosure may be implemented in any suitable network environment(s) with plane separation architecture, either SDN or non-SDN network environment(s).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136 (see also FIG. 2). Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (PNICs) 124A/124B/124C; and storage disk(s) 126A/126B/126C, etc.

Virtual resources are allocated to respective VMs 131-136 to support a guest operating system (OS) and application(s).

For example, VMs 131-136 support respective applications (see "APP1" to "APP6"). The virtual resources may include virtual CPU, guest physical memory, virtual disk, virtual network interface card or virtual network adapter (VNIC), etc. Hardware resources may be emulated using virtual machine monitors (VMMs). For example in FIG. 1, VNICs 141-146 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. Here, the term "logical port" or "logical switch port" may refer generally to a port on a logical switch to which a virtualized computing instance is connected. A "logical switch" may refer generally to an SDN construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks.

SDN manager 180 and SDN controller 184 are example management entities in SDN environment 100. One example of an SDN controller is the NSX controller component of VMware NSX® (available from VMware, Inc.) that operates on a central control plane. SDN controller 184 may be a member of a controller cluster (not shown for simplicity) that is configurable using SDN manager 180, which may be part of a manager cluster operating on a management plane. Management entity 180/184 may be implemented using physical machine(s), VM(s), or both. To send or receive control information, a local control plane (LCP) agent 119A/119B/119C on host 110A/110B/110C may interact SDN controller 184 via control-plane channel 101/102/103.

Hosts 110A-C may also maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header identifying the relevant logical overlay network (e.g., using a VXLAN or "virtual" network identifier (VNI) added to a header field). Encapsulated packets may be sent via an end-to-end, bi-directional communication path (known as a tunnel) between a pair of VTEPs over physical network 104.

VNICs for Networking Layer

In practice, host 110A/110B/110C may implement a networking layer (e.g., VMkernel networking layer) to provide connectivity among hosts 110A-C and handle various types of system traffic. The VMkernel networking layer may include multiple networking layer components or modules (see 151-156) that are configured to provide various system services. VNICs 161-166 (also known as VMkernel network interface cards (vmkNICs) or VMkernel network adapters) may be configured to forward system traffic to/from respective networking layer components 151-156. For example on host-A 110A, hypervisor-A 114A may support first networking layer component 151 (denoted as "S1") and second networking layer component 152 (denoted as "S2") that are associated with VNIC 161-162 (denoted as "vmkNIC1" and "vmkNIC2").

Depending on the desired implementation, a separate vmkNIC may be configured for each type of system traffic. For example, VNICs 161-166 may each be used to forward packets associated with one of the following system traffic types: VM migration traffic from one host to another, provisioning traffic (e.g., for cold migration, cloning and snapshot migration), IP storage and discovery traffic, fault tolerance traffic (e.g., between a primary VM and a secondary VM), data replication traffic, virtual storage area network (VSAN) traffic, network file copy (NFC) traffic, memory access traffic using any suitable technology (e.g., nonvolatile memory express (NVMe)), management traffic to/from management entity 180/184, etc.

To facilitate system traffic forwarding via VNICs 161-166, it is necessary to assign each VNIC with a hardware address in the form of a MAC address. Conventionally, to ensure that each MAC address is unique within SDN environment 100, a centralized entity such as management entity 180/184 (e.g., infrastructure manager) may be configured to perform MAC address assignment for all VNICs 161-166. However, such conventional approach may lack efficiency, especially in SDN environment 100 with hundreds (if not thousands) of VNICs that require MAC address assignment. In some cases, it may be necessary to create a particular VNIC via management entity 180/184 in order for management entity 180/184 to assign a MAC address to that VNIC.

Distributed Approach for MAC Address Assignment

According to examples of the present disclosure, MAC address assignment for VNICs may be implemented in a distributed manner by hosts 110A-C to improve efficiency. To ensure that its uniqueness within SDN environment 100, each independently assigned MAC address may include (a) a host-specific MAC address portion that is uniquely associated with host 110A/110B/110C and (b) a VNIC-specific MAC address portion that is uniquely associated with a particular VNIC on host 110A/110B/110C.

As used herein, the term "VNIC" may refer generally to a virtualized component or device that capable of providing an interface to a physical network (e.g., via an associated physical NIC, etc.). The term "portion" or "MAC address portion" may refer generally to a set of bit(s) that forms part of a MAC address, including a non-contiguous set of bits, etc. For convenience and ease of reference, a MAC address portion will also be referred to as a "MAC address prefix" or "MAC address suffix" in the examples below. In practice, it should be understood that the "MAC address prefix" may be in any arbitrary position relative to the "MAC address suffix" within a MAC address. Similarly, the "MAC address suffix" may be in any arbitrary position relative to the "MAC address prefix" within a MAC address. Each portion (e.g., prefix or suffix) may include any suitable number of bits. In at least some embodiments, the prefix may include bits that are not in the suffix (i.e., distinct from each other), and vice versa. Further, depending on the desired implementation, there may be an additional portion of bit(s) between the "MAC address prefix" and "MAC address suffix."

Figure 2:
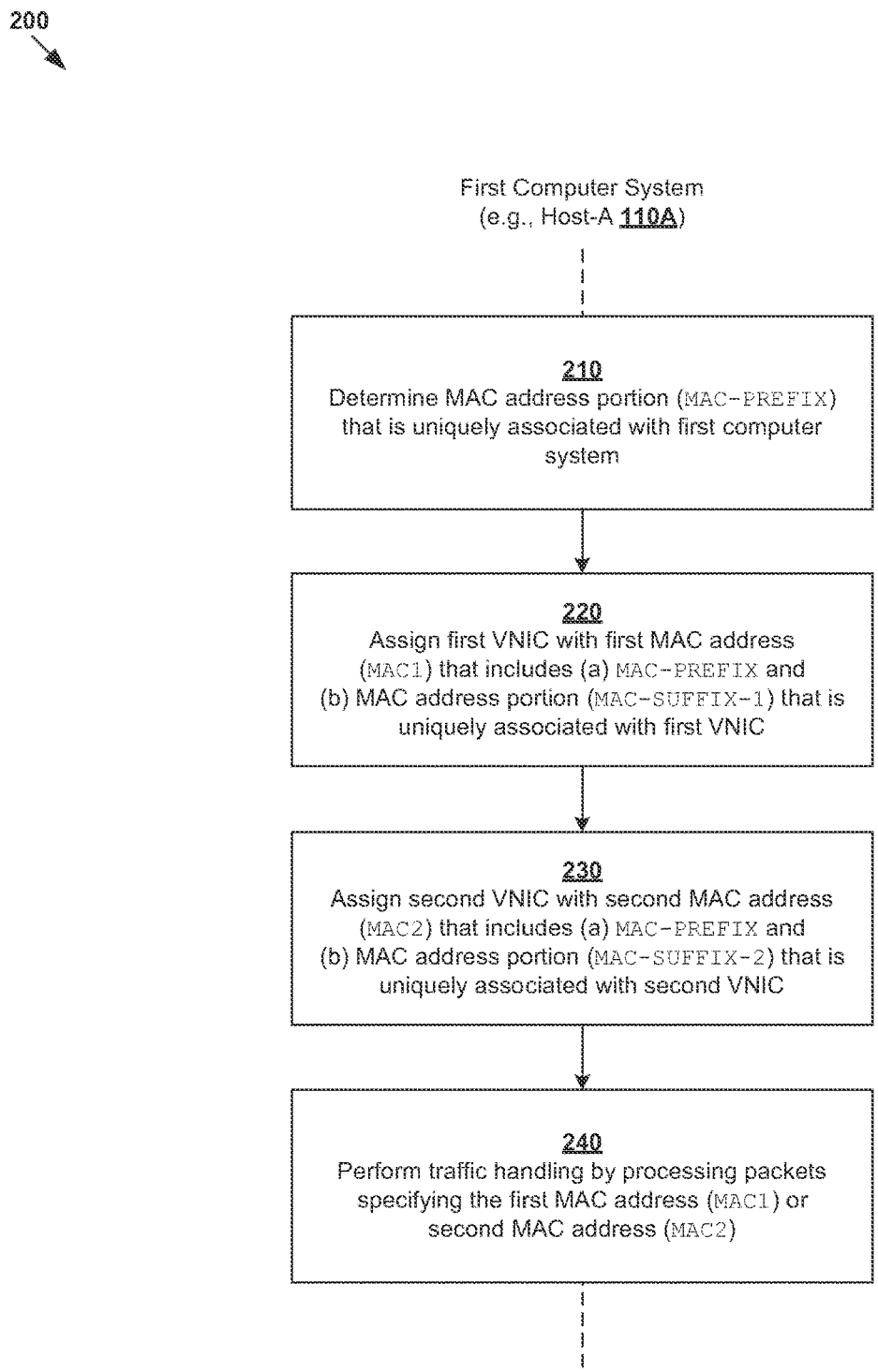
FIG. 2 is a flowchart of an example process for a first computer system to perform MAC address assignment for VNICs.

In more detail, FIG. 2 is a flowchart of example process 200 for a first computer system to perform MAC address assignment for VNICs. Example process 200 may include one or more operations, functions, or actions illustrated by one or more blocks, such as 210 to 240. Depending on the desired implementation, various blocks may be combined into fewer blocks, divided into additional blocks, and/or eliminated. FIG. 2 will be described using FIG. 3, which is a schematic diagram illustrating example MAC address assignment for VNICs.

In the following, various examples will be discussed using FIGS. 2-3 with references to host-A 110A as an example "first computer system," host-B 110B and host-C 110C as example "second computer systems," vmkNIC1 161 as an example "first VNIC," vmkNIC2 162 as an example "second VNIC," and SDN environment 100 as an example "network environment." It should be noted that host 110B/110C may also act as a "first computer system" to implement examples of the present disclosure to perform MAC address assignment for other VNIC(s).

In practice, host 110A/110B/110C may include any suitable component(s) or module(s) to implement examples of the present disclosure, such as MAC address generator 190A/190B/190C and MAC address reporter 192A/192B/192C on host 110A/110B/110C, etc. Management entity 180/184 may include any suitable component(s) or module(s) to implement examples of the present disclosure, such as MAC address prefix manager 301 and MAC address prefix collector 302 in FIG. 3.

At 210 in FIG. 2, host-A 110A may determine a first MAC address portion that is uniquely associated with host-A 110A within SDN environment 100 that includes hosts 110A-C. For example in FIG. 3, first MAC address portion=MAC-PREFIX-A may be uniquely associated with host-A 110A. Host-B 110B and host-C 110C may be uniquely associated with respective second MAC address portions=(MAC-PREFIX-B, MAC-PREFIX-C). See 310-330 in FIG. 3.

At 220-230 in FIG. 2, host-A 110A may perform MAC address assignment for various VNICs, such as vmkNIC1 161 and vmkNIC2 162. For example in FIG. 3, block 220 may involve host-A 110A assigning vmkNIC1 161 with a first MAC address (denoted as "MAC1") that includes (a) first MAC address portion=MAC-PREFIX-A and (b) third MAC address portion=MAC-SUFFIX-1. Block 230 may involve host-A 110A assigning vmkNIC2 162 with a second MAC address (denoted as "MAC2") that includes (a) second MAC address prefix=MAC-PREFIX-A and (b) fourth MAC address portion=MAC-SUFFIX-2. MAC-SUFFIX-1 and MAC-SUFFIX-2 are uniquely associated with respective vmkNIC1 161 and vmkNIC2 162 on host-A 110A. See 340-350 in FIG. 3.

At 240 in FIG. 2, host-A 110A may perform traffic handling by forwarding first packets specifying the first MAC address (MAC1) assigned to vmkNIC1 161, and second packets specifying the second MAC address (MAC1) assigned to vmkNIC2 162. The assigned MAC address may be used to egress and/or ingress traffic. For example in FIG. 3, a first packet (see "P1") may specify a source address=MAC1 assigned to vmkNIC1 161. A second packet (see "P2") may specify a destination address=MAC2 assigned to vmkNIC2 162. See 342 and 352 in FIG. 3.

Packets 342-352 may be associated with any suitable traffic type, such as system traffic discussed above (not repeated here for brevity). For example, first networking layer component 151 (denoted as "S1") may provide a VM migration service to move one VM from a source host to a target host. In this case, P1 342 forwarded via vmkNIC1 161 may be associated with VM migration traffic. In another example, second networking layer component 152 (denoted as "S2") may provide a VSAN-related service, in which case P2 352 forwarded via vmkNIC2 162 may be associated with VSAN-related traffic.

Examples of the present disclosure should be contrasted against conventional approaches that necessitate a centralized management entity (e.g., 180/184 in FIG. 1) to perform the MAC address assignment for each and every VNIC. Using examples of the present disclosure, each host 110A/110B/110C may act as a "first computer system" to perform MAC address assignment for various VNICs supported by that host. For example in FIG. 3, host-B 110B may assign MAC addresses=(MAC3, MAC4) to respective vmkNIC3 163 and vmkNIC4 164. Here, MAC3 includes (MAC-PREFIX-B, MAC-SUFFIX-3), and MAC4 includes (MAC-PREFIX-B, MAC-SUFFIX-4). See 360-370 in FIG. 3.

Similarly, host-C 110C may assign (MAC5, MAC6) to respective vmkNIC5 165 and vmkNIC6 166. Here, MAC5 includes (MAC-PREFIX-C, MAC-SUFFIX-1), and MAC6 includes (MAC-PREFIX-C, MAC-SUFFIX-2). See 380-390 in FIG. 3. As used herein, the term "uniquely associated" may refer generally to a one-to-one correspondence between a MAC address component (e.g., prefix or suffix) and an entity (e.g., host or VNIC). Note that the same MAC address suffix may be assigned to multiple VNICs on different hosts. For example, since MAC-PREFIX-A is uniquely associated with host-A 110A and MAC-PREFIX-C with host-C 110C, MAC-SUFFIX-1 may be assigned to both vmkNIC1 161 and vmkNIC5 165. See 340 and 380 in FIG. 3.

Detailed Examples

Figure 4:
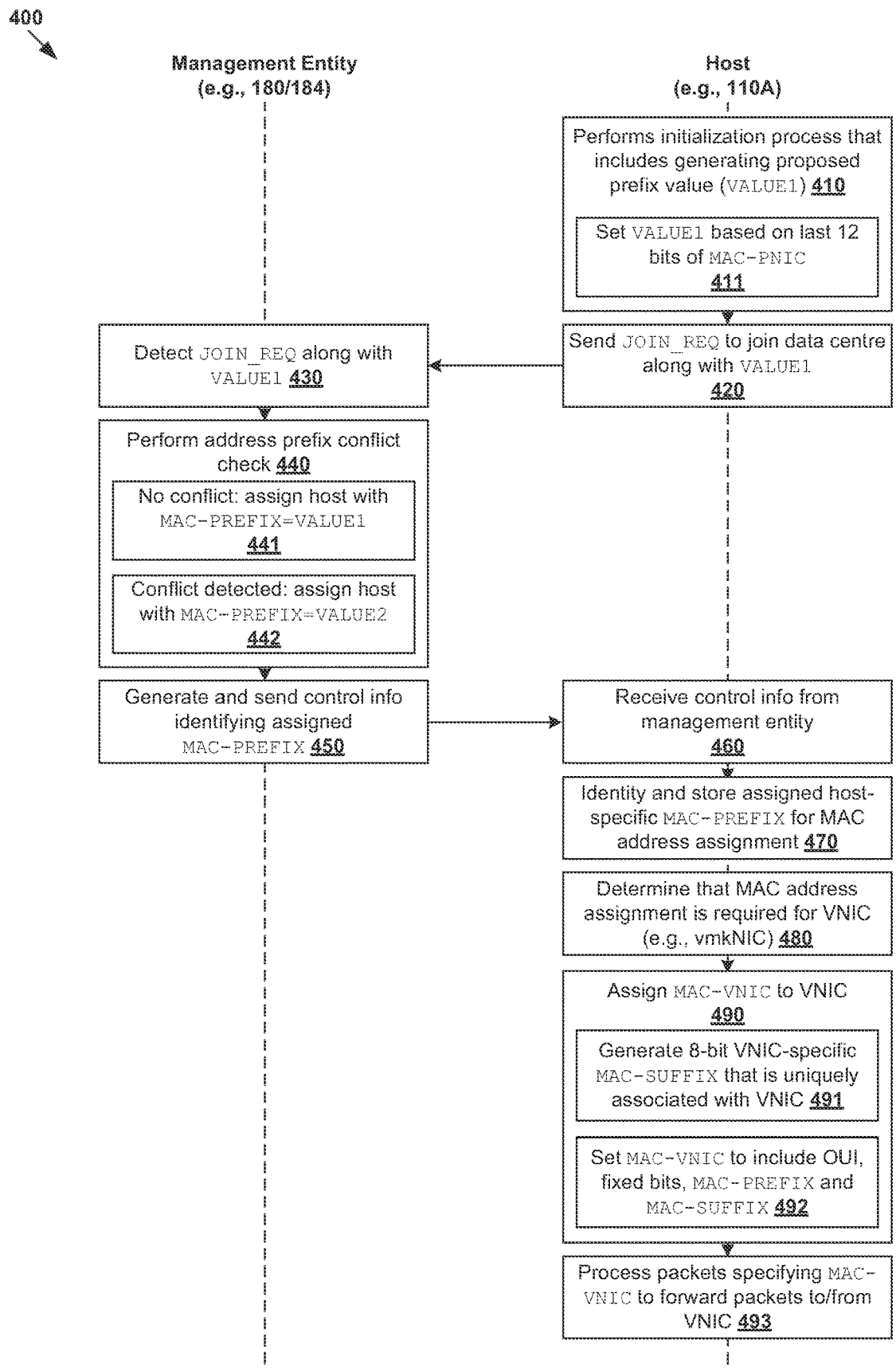
FIG. 4 is a flowchart of an example detailed process for a first computer system to perform MAC address assignment for VNICs.

Examples of the present disclosure will be explained further using FIG. 4, which is a flowchart of example detailed process 400 for a first computer system to perform MAC address assignment for VNICs. Example process 400 may include one or more operations, functions, or actions illustrated by one or more blocks, such as 410 to 493. Depending on the desired implementation, various blocks may be combined into fewer blocks, divided into additional blocks, and/or eliminated. FIG. 4 will be described using FIG. 5, which is a schematic diagram illustrating some examples 500 relating to MAC address prefix determination and MAC address structure.

(a) MAC Address Prefix Determination

At 410 in FIG. 4, prior to joining a data center via management entity 180/184, host-A 110A may perform a number of initialization operations. During an initialization phase, host-A 110A may generate a proposed value (denoted as "VALUE1") for a MAC address prefix to facilitate subsequent MAC address assignment. For example, MAC address generator 190A on host-A 110A may operate in a standalone mode to generate VALUE1 based on a MAC address (denoted as "MAC-PNIC") of a physical adapter (e.g., PNIC 124A). In one approach (see 411 in FIG. 4), VALUE1 may be the last 12 bits of MAC-PNIC (i.e., generally uniquely assigned by a hardware vendor) to reduce the possibility of a conflict with existing MAC address prefixes. See 510 in FIG. 5.

Note that during the initialization phase, host-A 110A is not managed by management entity 180/184 and VALUE1 may not be unique. As such, host-A 110A may request management entity 180/184 to perform a conflict check. In particular, at 420 in FIG. 4, MAC address reporter 192A on host-A 110A may report VALUE1 to MAC address collector 302 on management entity 180/184. In practice, VALUE1 may be reported along with a request to join a data center. The join request may specify any other information required for joining the data center. See 520 in FIG. 5.

At 430-440 in FIG. 4, in response to receiving VALUE1 from host-A 110A, MAC address prefix manager 301 on management entity 180/184 may perform a conflict check. In the example in FIG. 5, MAC-PREFIX-B and MAC-PREFIX-C have been assigned to respective host-B 110B and host-C 110C, which have already joined the data center and are being managed by management entity 180/184. In this case, the conflict check may involve comparing VALUE1 with MAC-PREFIX-B and MAC-PREFIX-C. In the case of no conflict (see 441), management entity 180/184 may assign MAC-PREFIX-A=VALUE1 to host-A 110A. Otherwise (see 442), management entity 180/184 may assign an alternative MAC-PREFIX-A=VALUE2 to host-A 110A.

At 450 in FIG. 4, management entity 180/184 may generate and send control information specifying MAC-PREFIX-A to host-A 110A. At 460-470, in response to receiving the control information, host-A 110A may determine that MAC-PREFIX-A is uniquely associated with host-A 110A for subsequent MAC address assignment for VNICs. See 540 in FIG. 5.

In practice, any alternative approach for MAC address prefix determination may be implemented provided that each MAC address prefix is unique to a particular host within a network environment. For example, management entity 180/184 may assign a unique MAC-PREFIX-A in response to receiving a request from host-A 110A to join a data center without requiring host-A 110A to generate a proposed prefix value during its initialization process.

(b) MAC Address Assignment

At 480-490 in FIG. 4, in response to determination that MAC address assignment is required, MAC address generator 190A on host-A 110A may perform MAC address assignment for vmkNICs 161-162. This involves generating MAC address portions in the form of MAC address suffixes=(MAC-SUFFIX-1, MAC-SUFFIX-2) that are uniquely associated with respective vmkNICs 161-162. First MAC address=MAC1 includes (a) host-specific MAC-PREFIX-A and (b) VNIC-specific MAC-SUFFIX-1. Second MAC address=MAC2 includes (a) host-specific MAC-PREFIX-A and (b) VNIC-specific MAC-SUFFIX-2. In other words, vmkNICs on the same host share a MAC address prefix but have different suffixes. Host-A 110A may also report the assigned MAC addresses to management entity 180/184. See 550 (MAC1), 560 (MAC2) and 570 (report) in FIG. 5.

Figure 5:
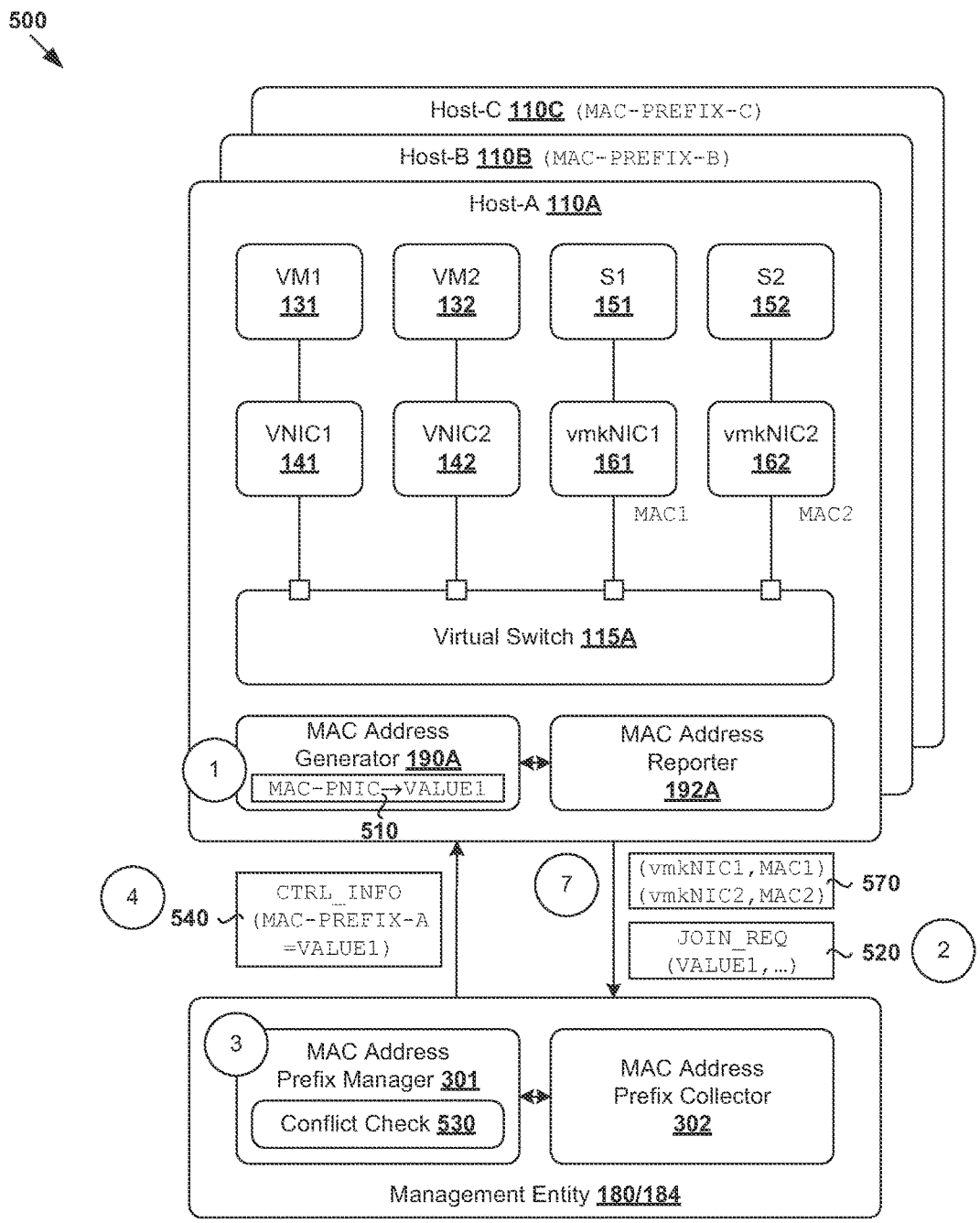
FIG. 5 is a schematic diagram illustrating examples relating to MAC address prefix determination and MAC address structure.
Figure 5:
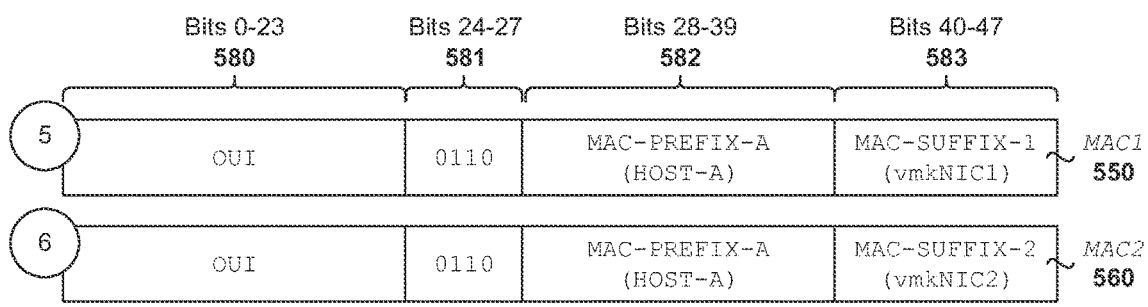

Any suitable MAC address structure may be used, an example of which is shown at 580-583 in FIG. 5. Depending on the desired implementation, each MAC address assigned by host-A 110A may include (a) bits 0-23 specifying an organizationally unique identifier (OUI), (b) bits 24-27 specifying a VNIC-related identifier (e.g., fixed bits=0110), (c) bits 28-39 (i.e., length=12 bits) specifying MAC-PREFIX-A and (d) remaining bits 40-47 (i.e., length=8 bits) specifying a MAC address suffix that is uniquely associated with a particular VNIC. Depending on the desired implementation, any alternative structure may be used, such as by adjusting the number of bits allocated for the MAC address prefix and MAC address suffix, etc. See also 491-492 in FIG. 4.

At 493 in FIG. 4, once MAC address assignment is performed, networking layer components 151-152 associated with respective vmkNICs 161-162 may use their assigned MAC address for interacting with another entity. Host-A 110A may perform traffic handling by processing and forwarding packets that each are addressed to (or from)

MAC1 assigned to vmkNIC1 161 or MAC2 assigned to vmkNIC2 162. See first packet(s) 342 and second packet(s) 352 in FIG. 3.

Depending on the desired implementation, examples of the present disclosure may be implemented for MAC address assignment for other type(s) of VNICs, not just vmkNICs 161-166 associated with respective networking layer components 151-156. In practice, a particular host may support any suitable number of VNICs that require MAC address assignment.

Figure 3:
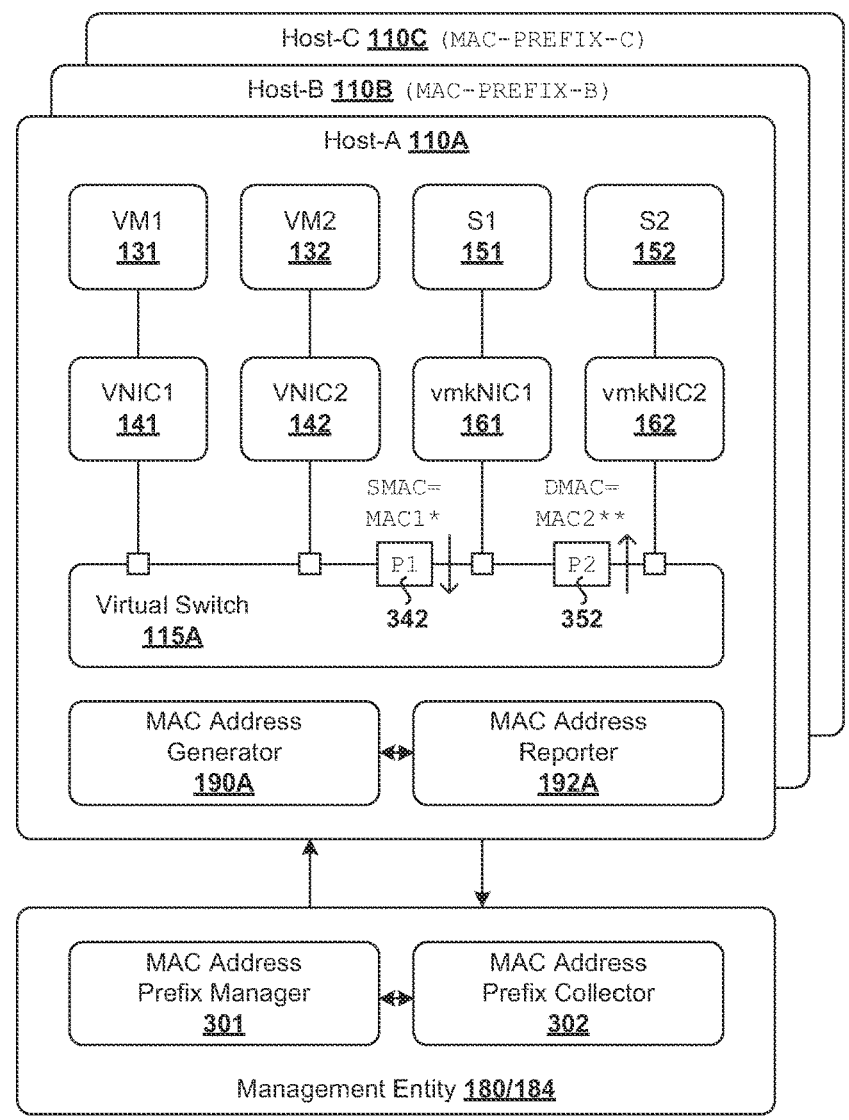
FIG. 3 is a schematic diagram illustrating an example MAC address assignment for VNICs.

Further, host 110B/110C may implement the examples in FIGS. 4-5 to perform MAC address assignment for respective vmkNICs 163-166 to generate MAC addresses 360-390 in FIG. 3. In general, since MAC-PREFIX-A is uniquely associated with host-A 110A, the assigned MAC addresses may be maintained when host-A 110A moves to a different data center. This also applies to hosts 110B-C. By configuring host 110A/110B/110C to perform MAC address assignment locally and independently, management entity 180/184 may be alleviated of the burden associated with processing, and responding to, MAC address assignment requests from various hosts. This way, management entity 180/184 may be able to dedicate resources to other important management tasks.

Container Implementation

Although discussed using VMs 131-136, it should be understood that MAC address assignment may be performed for other virtualized computing instances, such as containers, etc. The term "container" (also known as "container instance") is used generally to describe an application that is encapsulated with all its dependencies (e.g., binaries, libraries, etc.). For example, multiple containers may be executed as isolated processes inside VM1 131, where a different VNIC is configured for each container. Each container is "OS-less", meaning that it does not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 5. For example, any suitable computer system capable of acting as host 110A/110B/110C may be deployed in SDN environment 100 to perform examples of the present disclosure.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a first computer system to perform media access control (MAC) address assignment, wherein the method comprises:

determining a first MAC address portion that is uniquely associated with the first computer system within a network environment that includes the first computer system, and multiple second computer systems that are uniquely associated with respective multiple second MAC address portions;

assigning a first virtual network interface card (VNIC) with a first MAC address that includes (a) the first MAC address portion, and (b) a third MAC address portion that is uniquely associated with the first VNIC on the first computer system; and assigning a second VNIC with a second MAC address that includes (a) the first MAC address portion, and (b) a fourth MAC address portion that is uniquely associated with the second VNIC on the first computer system; and performing traffic handling by forwarding first packets specifying the first MAC address assigned to the first VNIC, or second packets specifying the second MAC address assigned to the second VNIC.

2. The method of claim 1, wherein determining the first MAC address portion comprises:
generating and sending a proposed value for the first MAC address portion to management entity to cause the management entity to perform a conflict check based on the proposed value and the multiple second MAC address portions.

3. The method of claim 2, wherein determining the first MAC address portion comprises:
receiving, from the management entity, control information specifying the first MAC address portion in the form of one of the following: (a) the proposed value in case of no conflict with the multiple second MAC address portions, or (b) an alternative prefix value assigned by the management entity in case of a conflict with one of the multiple second MAC address portions.

4. The method of claim 2, wherein determining the first MAC address portion comprises:
generating the proposed value based on a MAC address associated with a physical network interface card (PNIC) of the first computer system as part of an initialization process prior to joining a data center.

5. The method of claim 1, wherein assigning the first VNIC with the first MAC address and the second VNIC with the second MAC address comprises:
generating the first MAC address to include (a) an organizationally unique identifier (OUI), (b) a VNIC-related identifier, (c) the first MAC address portion and (d) the third MAC address portion; and
generating the second MAC address to include (a) the OUI, (b) the VNIC-related identifier, (c) the first MAC address portion and (d) the fourth MAC address portion.

6. The method of claim 1, wherein assigning the first VNIC with the first MAC address comprises:
generating the third MAC address portion for the first VNIC in the form of a virtual machine kernel network interface card (vmkNIC) that is configured to forward packets to and from a first networking layer component on the first computer system.

7. The method of claim 1, wherein performing traffic handling comprises:
forwarding the first packets to, or from, a first networking layer component via the first VNIC, wherein the first packets are associated with one of the following traffic types: virtual machine migration traffic, data replication, provisioning traffic, Internet Protocol (IP) storage and discovery traffic, fault tolerance traffic, data replication traffic, virtual storage area network (VSAN) traffic, network file copy (NFC) traffic, memory access traffic and management traffic.

8. The computer system of claim 1, wherein the instructions for determining the first MAC address portion cause the processor to:
generate and send a proposed value to management entity to cause the management entity to perform a conflict check based on the proposed value and the multiple second MAC address portions.

9. The computer system of claim 8, wherein the instructions for determining the first MAC address portion cause the processor to:
receive, from the management entity, control information specifying the first MAC address portion in the form of one of the following: (a) the proposed value in case of no conflict with the multiple second MAC address portions, or (b) an alternative prefix value assigned by the management entity in case of a conflict with at least one of the multiple second MAC address portions.

10. The computer system of claim 8, wherein the instructions for determining the first MAC address portion cause the processor to:
generate the proposed value based on a MAC address associated with a physical network interface card (PNIC) of the first computer system as part of an initialization process prior to joining a data center.

11. The computer system of claim 1, wherein the instructions for assigning the first VNIC with the first MAC address and the second VNIC with the second MAC address cause the processor to:
generate the first MAC address to include (a) an organizationally unique identifier (OUI), (b) a VNIC-related identifier, (c) the first MAC address portion and (d) the third MAC address portion; and
generate the second MAC address to include (a) the OUI, (b) the VNIC-related identifier, (c) the first MAC address portion and (d) the fourth MAC address portion.

12. The computer system of claim 1, wherein the instructions for assigning the first VNIC with the first MAC address cause the processor to:
generate the third MAC address portion for the first VNIC in the form of a virtual machine kernel network interface card (vmkNIC) that is configured to forward packets to and from a first networking layer component on the first computer system.

13. The computer system of claim 1, wherein the instructions for performing traffic handling cause the processor to:
forward the first packets to, or from, a first networking layer component via the first VNIC, wherein the first packets are associated with one of the following traffic types: virtual machine migration traffic, data replication, provisioning traffic, Internet Protocol (IP) storage and discovery traffic, fault tolerance traffic, data replication traffic, virtual storage area network (VSAN) traffic, network file copy (NFC) traffic, memory access traffic and management traffic.

14. A non-transitory computer-readable storage medium that includes a set of instructions which, in response to execution by a processor of a first computer system, cause the processor to perform media access control (MAC) address assignment, wherein the method comprises:
determining a first MAC address portion that is uniquely associated with the first computer system within a network environment that includes the first computer system and multiple second computer systems that are uniquely associated with respective multiple second MAC address portions;
assigning a first virtual network interface card (VNIC) with a first MAC address that includes (a) the first MAC address portion and (b) a third MAC address portion that is uniquely associated with the first VNIC on the first computer system; and
assigning a second VNIC with a second MAC address that includes (a) the first MAC address portion and (b) a fourth MAC address portion that is uniquely associated with the second VNIC on the first computer system; and
performing traffic handling by forwarding first packets specifying the first MAC address assigned to the first VNIC, or second packets specifying the second MAC address assigned to the second VNIC.

15. The non-transitory computer-readable storage medium of claim 14, wherein determining the first MAC address portion comprises:

generating and sending a proposed value to management entity to cause the management entity to perform a conflict check based on the proposed value and the multiple second MAC address portions.

16. The non-transitory computer-readable storage medium of claim 15, wherein determining the first MAC address portion comprises:

receiving, from the management entity, control information specifying the first MAC address portion in the form of one of the following: (a) the proposed value in case of no conflict with the multiple second MAC address portions, or (b) an alternative prefix value assigned by the management entity in case of a conflict with at least one of the multiple second MAC address portions.

17. The non-transitory computer-readable storage medium of claim 15, wherein determining the first MAC address portion comprises:

generating the proposed value based on a MAC address associated with a physical network interface card (PNIC) of the first computer system as part of an initialization process prior to joining a data center.

18. The non-transitory computer-readable storage medium of claim 14, wherein assigning the first VNIC with the first MAC address and the second VNIC with the second MAC address comprises:

generating the first MAC address to include (a) an organizationally unique identifier (OUI), (b) a VNIC-related identifier, (c) the first MAC address portion and (d) the third MAC address portion; and generating the second MAC address to include (a) the OUI, (b) the VNIC-related identifier, (c) the first MAC address portion and (d) the fourth MAC address portion.

19. The non-transitory computer-readable storage medium of claim 14, wherein assigning the first VNIC with the first MAC address comprises:

generating the third MAC address portion for the first VNIC in the form of a virtual machine kernel network interface card (vmkNIC) that is configured to forward packets to and from a first networking layer component on the first computer system.

20. The non-transitory computer-readable storage medium of claim 14, wherein performing traffic handling comprises:

forwarding the first packets to, or from, a first networking layer component via the first VNIC, wherein the first packets are associated with one of the following traffic types: virtual machine migration traffic, data replication, provisioning traffic, Internet Protocol (IP) storage and discovery traffic, fault tolerance traffic, data replication traffic, virtual storage area network (VSAN) traffic, network file copy (NFC) traffic, memory access traffic and management traffic.

21. A computer system, being a first computer system, comprising:

a processor; and a non-transitory computer-readable medium having stored thereon instructions that, when executed by the processor, cause the processor to perform the following:

determine a first Media Access Control (MAC) address prefix that is uniquely associated with the first computer system within a network environment that includes the first computer system and multiple second computer systems that are uniquely associated with respective multiple second MAC address portions;

assign a first virtual network interface card (VNIC) with a first MAC address that includes (a) the first MAC address portion and (b) a third MAC address portion that is uniquely associated with the first VNIC on the first computer system; and assign a second VNIC with a second MAC address that includes (a) the first MAC address portion and (b) a fourth MAC address portion that is uniquely associated with the second VNIC on the first computer system; and perform traffic handling by forwarding first packets specifying the first MAC address assigned to the first VNIC, or second packets specifying the second MAC address assigned to the second VNIC.

\* \* \* \* \*